(12) United States Patent
Aptekar

(10) Patent No.: US 7,191,942 B2
(45) Date of Patent: Mar. 20, 2007

(54) TRANSFER VERIFICATION PRODUCTS AND METHODS

(76) Inventor: Larry Aptekar, 4405 Lula St., Harris County, Bellaire, TX (US) 77401-5223

( * ) Notice: Subject to any disclaimer, the term of this patent is extended or adjusted under 35 U.S.C. 154(b) by 178 days.

(21) Appl. No.: 10/639,370

(22) Filed: Aug. 12, 2003

(65) Prior Publication Data

US 2004/0149823 A1 Aug. 5, 2004

Related U.S. Application Data

(63) Continuation-in-part of application No. 10/400,180, filed on Mar. 26, 2003.

(60) Provisional application No. 60/443,724, filed on Jan. 30, 2003.

(51) Int. Cl.
*G06F 19/00* (2006.01)
*G06Q 30/00* (2006.01)
*G06Q 90/00* (2006.01)

(52) U.S. Cl. ........................... 235/385; 235/470

(58) Field of Classification Search ............... 235/385, 235/470; 705/22, 28
See application file for complete search history.

(56) References Cited

U.S. PATENT DOCUMENTS

| | | | | |
|---|---|---|---|---|
| 4,309,094 A | * | 1/1982 | Bollen | 396/5 |
| 4,462,045 A | | 7/1984 | Norris | 358/93 |
| 4,730,849 A | | 3/1988 | Siegel | 283/70 |
| 5,038,283 A | * | 8/1991 | Caveney | 705/28 |
| 5,748,755 A | | 5/1998 | Johnson et al. | 382/115 |
| 5,782,496 A | * | 7/1998 | Casper et al. | 283/81 |
| 6,104,427 A | * | 8/2000 | Stein et al. | 348/61 |
| 6,106,020 A | | 8/2000 | Leef et al. | 283/67 |
| 6,137,895 A | | 10/2000 | Al-Sheikh | 382/115 |
| 6,220,515 B1 | | 4/2001 | Bello | 235/487 |
| 6,370,222 B1 | | 4/2002 | Cornick, Jr. | 378/57 |
| 6,497,358 B1 | | 12/2002 | Walsh | 235/380 |
| 6,539,360 B1 | * | 3/2003 | Kadaba | 705/28 |
| 6,547,137 B1 | * | 4/2003 | Begelfer et al. | 235/385 |
| 2001/0056313 A1 | * | 12/2001 | Osborne | 700/245 |
| 2002/0126878 A1 | | 9/2002 | Al-Sheikh | 382/115 |
| 2003/0065805 A1 | * | 4/2003 | Barnes, Jr. | 709/231 |

\* cited by examiner

*Primary Examiner*—Lisa M. Caputo
(74) *Attorney, Agent, or Firm*—Baker Botts L.L.P.

(57) ABSTRACT

A documentation product and methods for using the product to check a shipment and take responsibility for a shipment are included. The documentation product includes a transfer document that corresponds to a shipment. The transfer document includes identification of a carrier, identification of a destination, and identification of an image. The identified image depicts the shipment. The identified image can be compared with a received shipment such that discrepancies can be determined. The transfer document can also be acknowledged as corresponding to the shipment depicted at least in part by the image.

4 Claims, 20 Drawing Sheets

| CARRIER: 11 | DATE SHIPPED | 15 |
| | SHIPPER ACCOUNT | 16 |
| | PO NUMBER | 17 |

CONSIGNEE: 12

STREET ADDRESS (NOT A P.O. BOX)

| CITY | STATE | ZIP |
|---|---|---|
| | | |

SHIPPER: 13

STREET ADDRESS (NOT A P.O. BOX)

| CITY | STATE | ZIP |
|---|---|---|

| NO. OF PIECES 23 | HM 24 | KIND OF PACKAGE:DESCRIPTION OF ARTICLES SPECIAL MARKS AND EXCEPTIONS 25 |
|---|---|---|
| | | |
| | | |
| | | |
| | | |
| | | |
| | | |

MARK "HM" COLUMN WITH AN "X" TO DESIGNATE HAZARDOUS MATERIAL AS DEFINED IN THE DEPARTMENT OF TR

NOTE- WHERE THE RATE IS DEPENDENT ON VALUE, SHIPPERS ARE REQUIRED TO STATE SPECIFICALLY IN WRITING THE PROPERTY AS FOLLOWS:

*FIG. 1A*

| PUT PRO LABEL HERE | 22 |

SELECT
○ PREPAID (SHIPPER)   ○ COLLECT (CONSIGNER)   *18*
FREIGHT CHARGES are PREPAID unless marked collect
CHECK BOX IF COLLECT

SPECIAL INSTRUCTIONS
*19*

BILL TO
COMPANY  *14*
ADDRESS
CITY  *26*   *27*   STATE   ZIP  *28*

| | CLASS | WEIGHT IN LBS (SUBJECT TO CORR) | RATE |
|---|---|---|---|
| | | | |
| | | | |
| | | | |
| | | | |
| | | | |
| | | | |
| | | | |

ANSPORTATION REGULATIONS GOVERNING TRANSPORTATION OF HAZARDOUS MATERIAL

THE AGREED OR DECLARED VALUE OF

*FIG.1B*

THE AGREED OR DECLARED VALUE OF THE PROPERTY IS HEREBY SPECIFICALLY STATED BY THE SHIPPER TO BE NOT

NOTE-IT IS ALSO AGREED THAT THE CARRIER WILL NOT BE LIABLE FOR ANY CONSEQUENTIAL DAMAGES ARISING CONCERNING DELIVERY DATES OR TIMES

NOTE-COMMODITIES REQUIRING SPECIAL OR ADDITIONAL CARE OR ATTENTION IN HANDLING OR STOWING MUST TO ENSURE SAFE TRANSPORTATION WITH ORDINARY CARE. SEE SEC. 2(E) OR NMFC ITEM 360.

RECEIVED, SUBJECT TO INDIVIDUALLY DETERMINED RATES OR CONTRACTS THAT HAVE BEEN TO THE RATES, CLASSIFICATIONS AND RULES THAT HAVE BEEN ESTABLISHED BY THE CARRIE GOOD ORDER, EXCEPT AS NOTED (CONTENTS AND CONDITION OF CONTENTS OF PACKAGES UNKNOWN) MARKED, CON ROUTE, OR OTHERWISE TO DELIVER TO ANOTHER CARRIER ON THE ROUTE TO DESTINATION. IT IS MUTUALLY AGRE DESTINATION, AND AS TO EACH PARTY AT ANY TIME INTERESTED IN ALL OR ANY OF SAID PROPERTY, THAT EVERY BILL OF LADING SET FORTH IN THE NATIONAL MOTOR FREIGHT CLASSIFICATION 100-X AND SUCCESSIVE ISSUES. T LADING, INCLUDING THOSE ON THE BACK THEREOF, AND THE SAID TERMS AND CONDITIONS ARE HEREBY AGREED

THIS IS TO CERTIFY THAT THE ABOVE NAMED MATERIALS ARE PROPERLY CLASSIFIED, D PACKAGED, MARKED AND LABELED, AND ARE IN PROPER CONDITION FOR TRANSPORTA TO THE APPLICABLE REGULATIONS OF THE DEPARTMENT OF TRANSPORTATION

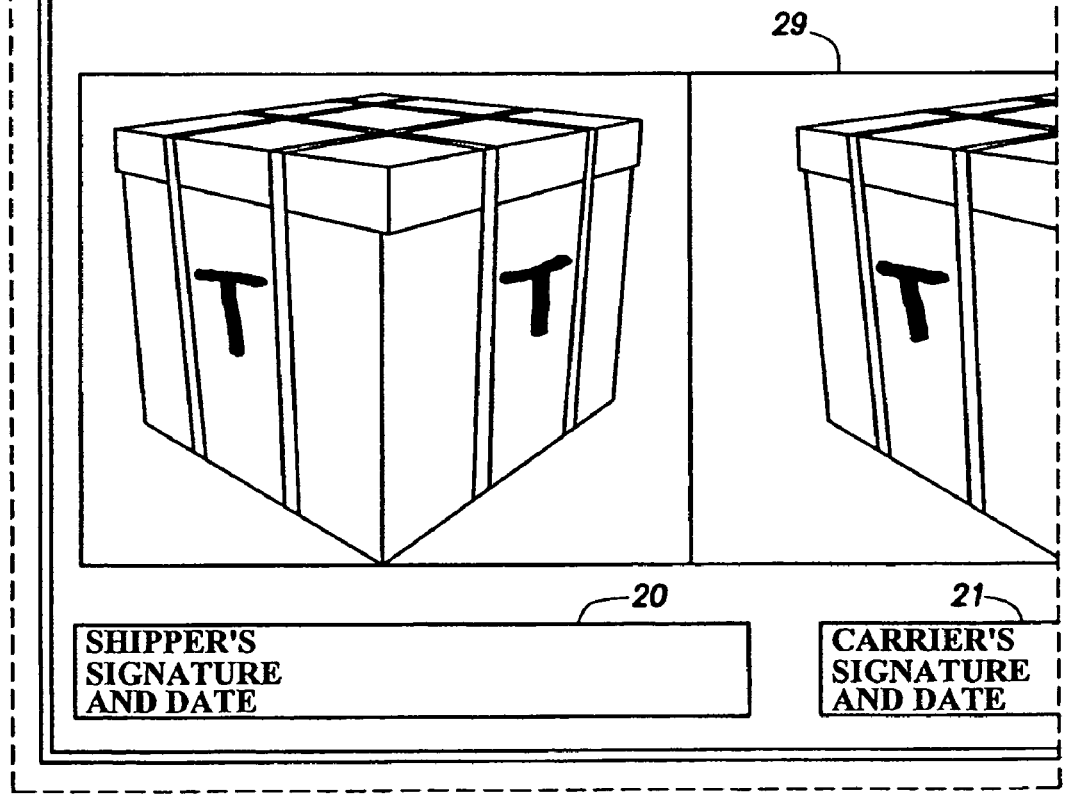

FIG. 1C

EXCEEDING _____ PER _____.

FROM THE DELAY OF THE DELIVERY AND CARRIER MAKES NO GUARANTEES

BE SO MARKED AND PACKAGED AS

AGREED UPON IN WRITING BETWEEN THE CARRIER AND SHIPPER, IF APPLICABLE, OTHERWISE
R AND ARE AVAILABLE TO THE SHIPPER, ON REQUEST. THE PROPERTY DESCRIBED ABOVE, IN APPARENT
SIGNED, AND DESTINED AS SHOWN ABOVE, WHICH SAID CARRIER AGREES TO CARRY TO DESTINATION, IF ON ITS
D, AS TO EACH CARRIER OF ALL OR ANY OF SAID PROPERTY OVER ALL OR ANY PORTION OF SAID ROUTE TO
SERVICE TO BE PERFORMED HEREUNDER SHALL BE SUBJECT TO ALL THE TERMS AND CONDITIONS OF THE UNIFORM
HE SHIPPER HEREBY CERTIFIES THAT HE IS FAMILIAR WITH ALL THE TERMS AND CONDITIONS OF THE SAID BILL OF
TO BY THE SHIPPER AND ACCEPTED FOR HIMSELF AND HIS ASSIGNS.

ESCRIBED,
TION ACCORDING

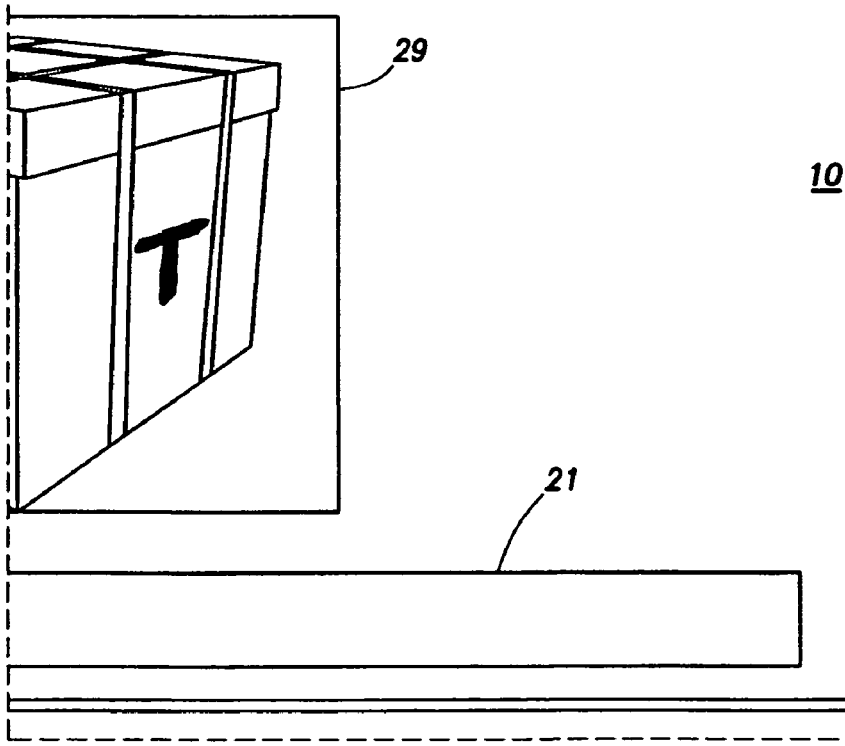

FIG. 1D

TRANSFER VERIFICATION PRODUCTS AND METHODS

CROSS-REFERENCE TO RELATED APPLICATIONS

This patent application is a continuation-in-part patent application of, and claims priority to, commonly owned U.S. patent application Ser. No. 10/400,180, filed Mar. 26, 2003, entitled, "Transfer Verification Products and Methods," by Larry Aptekar, which itself claims benefit of U.S. provisional patent application Ser. No. 60/443,724, filed Jan. 30, 2003, both of which are incorporated herein by reference for all purposes.

FIELD OF THE INVENTION

This invention relates generally to documents used in shipping and related transactions, and more particularly to photographic documentation and verification wherein photographs or images of goods or property that are the subject of the transaction are associated with physical documents used in the shipping or related transaction for purposes of identification, authentication, verification or confirmation of the transaction or condition of the goods.

BACKGROUND

Many paper documents and forms known as "documents of title" or transfer documents are used in commercial transactions such as: bills of lading, airbills (or airwaybills), warehouse receipts, as well as other paper documents and forms such as: delivery orders, delivery receipts, shipping or tracking labels, and confirmation of shipping forms.

A "bill of lading" is a document of title issued by a consignor or shipper of goods or personal property that evidences the receipt of goods or personal property for shipment by a commercial carrier. The consignor is the person named in the bill as the person from whom the goods have been received for shipment. The bill of lading provides written instructions to the commercial carrier including those related to the shipment of the personal property to the consignee (the person named in a bill to whom or to whose order the bill promises delivery). Furthermore it describes, in written words, the personal property or goods that are being shipped and often how it is packed. Before making delivery of the shipment to the consignee, the commercial carrier typically generates a "delivery receipt" which provides evidence of the delivery and which describes the personal property or goods being delivered, in written words that usually copy those used in the bill of lading. Typically, a "tracking label", bearing an assigned tracking number and barcode that identifies the shipment is applied to the bill of lading and/or the shipment itself. A "warehouse receipt" is a document of title that is used to acknowledge possession of the personal property or goods being stored in a warehouse and, like the other documents, it describes, in written words, the personal property or goods that are being stored.

One problem with conventional paper "documents of title" and other documents and forms used in commercial shipping transactions is that they only provide a written description of the goods or personal property making up the shipment and how it is packed. These types of paper documents and forms can be subject to fraud or accidental mistakes in identifying the goods or property involved in the transaction. Furthermore, after an event of tampering or pilferage has occurred, it is possible for the written description to remain unchanged and still adequately describe the appearance of the shipment in its tampered with or pilfered condition.

Thus, based on the written description alone, it is possible that a consignee will not recognize if the shipment has been pilfered or tampered with, or identify where this pilferage and/or tampering took place (e.g., before or after the commercial carrier took possession of the shipment). Pilferage is an ongoing problem in the shipping industry, particularly with high-value, small-sized commodities. Another problem is that with recently heightened security concerns, shipments that have been tampered with can pose a security threat or health hazard, and it is important for law enforcement to identify where the tampering occurred in order to prevent future tampering.

In instances where goods or property is shipped in cargo containers, a numbered security seal can be placed on the outside of that shipping container. Where such a seal is used, the container number and seal number can be noted on the bill of lading or other shipping document. However, criminal elements and others who would want to tamper with the contents of the container could break the seal and repair it or replace it with another one with the same number, or, they could replace an entire shipping container that used the same container number markings.

It is also possible for criminals to keep the original seal fully intact by cutting the rings (attached to the container and into which the seal is placed) in such a way as to allow the criminal to open the container and to then repair or replace these rings in such a way as to conceal the tampering by keeping the seal intact.

SUMMARY

Implementations of the present invention overcome the stated problems by identifying in the transfer documents image information corresponding to the shipment. No one of the above-discussed problems is critical and different implementations of the inventions may solve different problems.

In general, in one aspect, the invention features a documentation product. The documentation product includes a transfer document that corresponds to a shipment. The transfer document includes identification of a carrier, identification of a destination, and identification of an image. The identified image depicts the shipment. Uses of the documentation product include, but are not limited to, identifying to a carrier the shipment to be received, establishing the acknowledged goods or property to be shipped, identifying prior condition of the shipment at a security check, and identifying to a recipient the shipment to be received.

In general, in another aspect, the invention features a method of checking a shipment. The method includes receiving a transfer document that has identification of an image depicting the shipment. The shipment is viewed. The image is viewed. The shipment is compared to the image such that discrepancies can be determined. The method can be used for many purposes including, but not limited to, determining whether a security risk is present, determining whether damage has occurred, and determining whether pilferage has occurred.

In general, in another aspect, the invention features a method of taking responsibility for a shipment. The method includes receiving a shipment. A transfer document that includes identification of an image depicting the shipment is also received. The transfer document is then acknowledged. The method can be used for many purposes including, but not limited to, defining the liability risk to which a shipper

BRIEF DESCRIPTION OF THE DRAWINGS

FIG. 1A–1D are enlarged views of portions of FIG. 1.

At the destination receiving the shipment, the images are received identifying a first symbol with a first side of the shipment and a second symbol with a second side of the shipment. An individual or an automated system can then view those symbols on the sides of the received shipment. In the case of a customs or security inspection, the receipt of the images, or other communication identifying the symbols with the sides of the shipment, may occur in association with a request to permit movement of the shipment. The symbols can then be viewed by the appropriate official or automated process.

Figure 13:
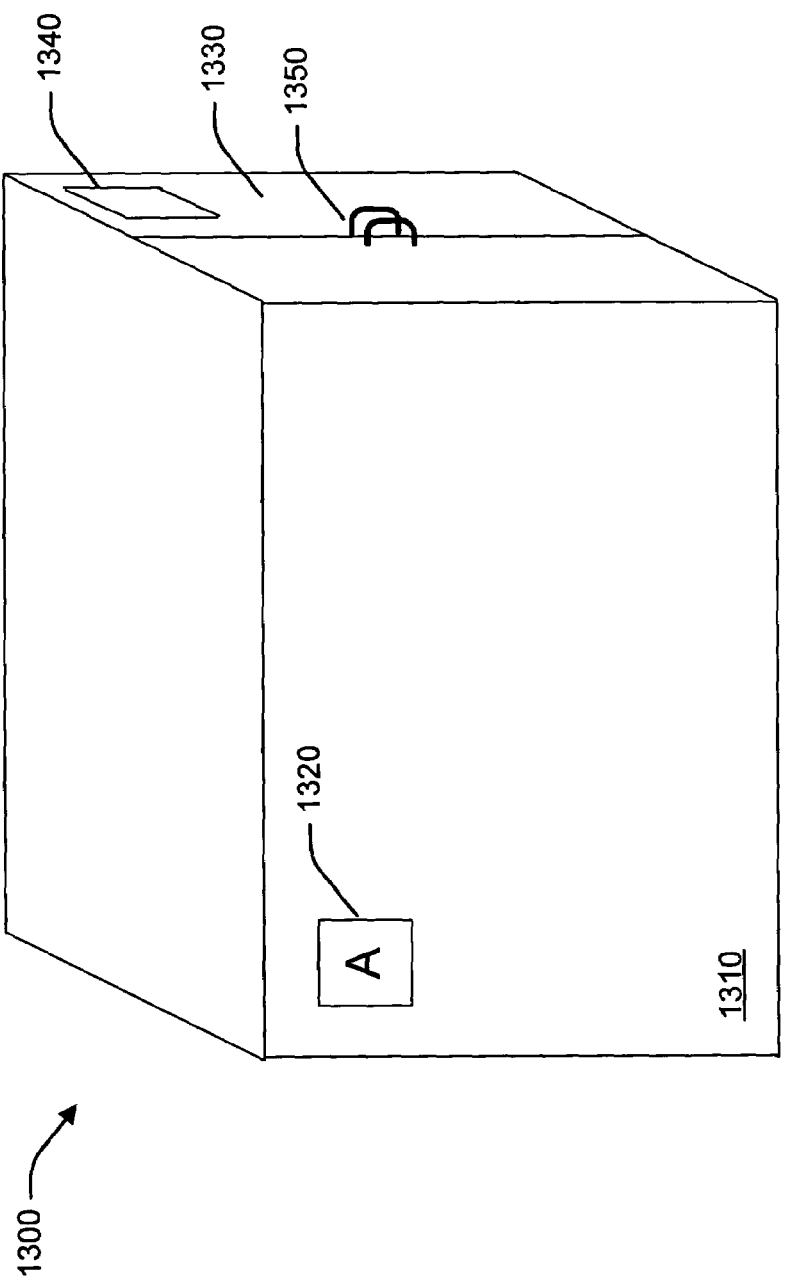
FIG. 13 illustrates an outside view of a container 1300. A container is a receptacle for the storage or transportation of goods, and includes freight pallets, boxes, ship-borne containers as well as automobiles, truck trailers and railroad cars. A container may also include a combination of the above, for example a number of boxes on a pallet can be a container. The container 1300 can include goods enclosed within and accessible through a door 1330. A shipment can be a container, but a shipment can also comprise one or more goods that are not in or on a receptacle. For example, in some situations, large pieces of machinery are shipped without a container. The container 1300 includes a side 1310 that has a symbol 1320. In the embodiment shown, the symbol 1320 is a letter of the alphabet. In other embodiments, the symbol 1320 can be a number or a particular color, among other possibilities. Another side 1330 contains the door or access to the inside of the container 1300. A symbol 1340 is present on side 1330. In other embodiments, the top side of the container can also have a symbol. The access can be opened by handles 1350. In one embodiment, a seal is mounted through handles 1350. In another embodiment, handles 1350 are replaced with a sliding lock mechanism. A seal can also be used with a sliding lock mechanism.
Figure 14:
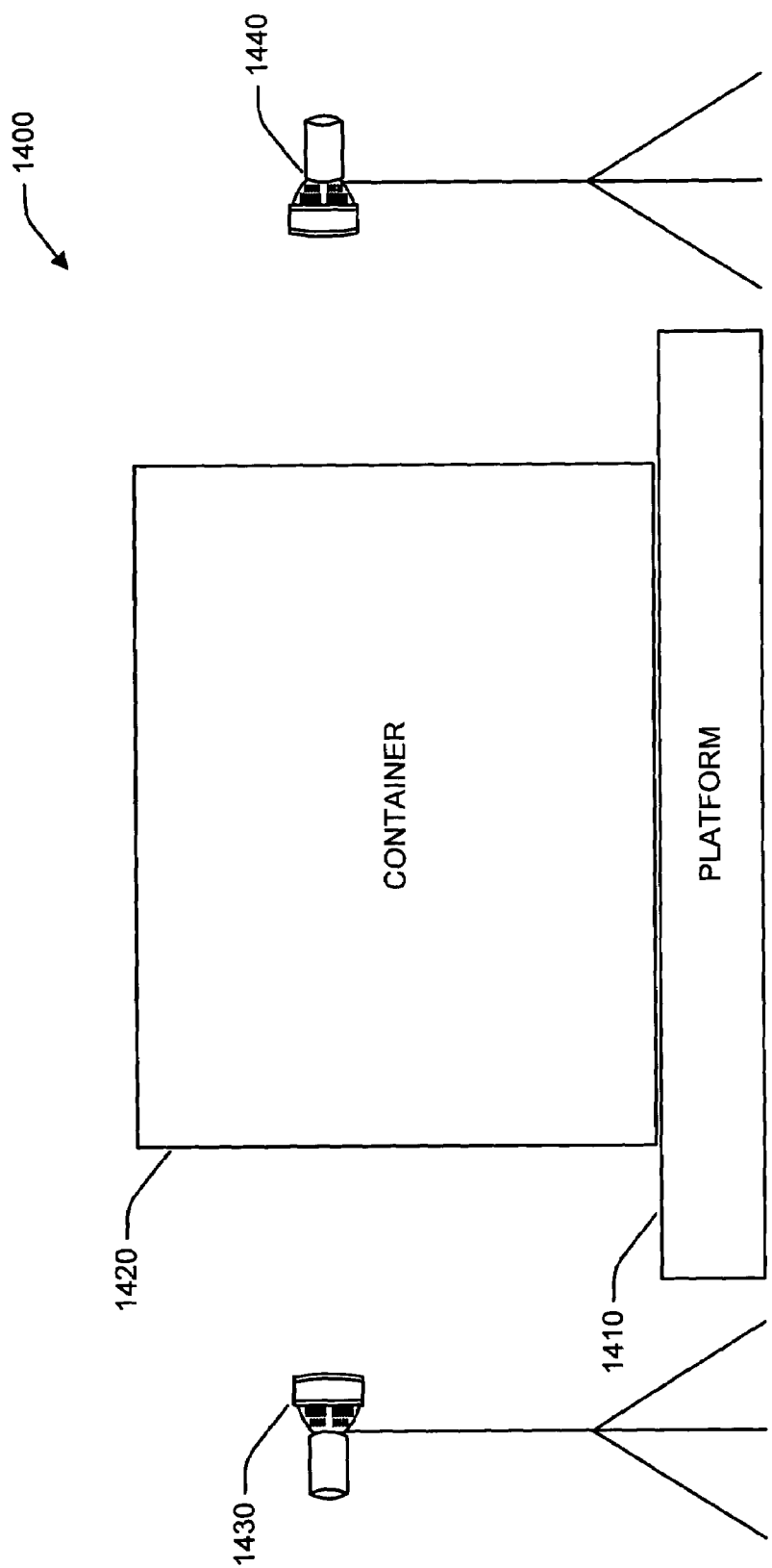
FIG. 14 illustrates a system 1400 for imaging a shipment. The system 1400 includes a platform 1410 for supporting the shipment. The shipment shown is a container 1420. In another embodiment, no platform 1410 is used. A first camera 1430 and a second camera 1440 are mounted to face opposite sides of the container 1420. In another embodiment, additional cameras are mounted to face additional sides of the container 1420. In an alternative embodiment, one camera 1430 is mounted to move around the container 1420 and receive images from different sides of the container 1420. In another alternative embodiment, one camera 1430 is mounted to take images of different sides of the container 1420 as the container 1420 moves relative to the camera 1430. The shipment can include symbols as disclosed in FIG. 13.
Figure 15:
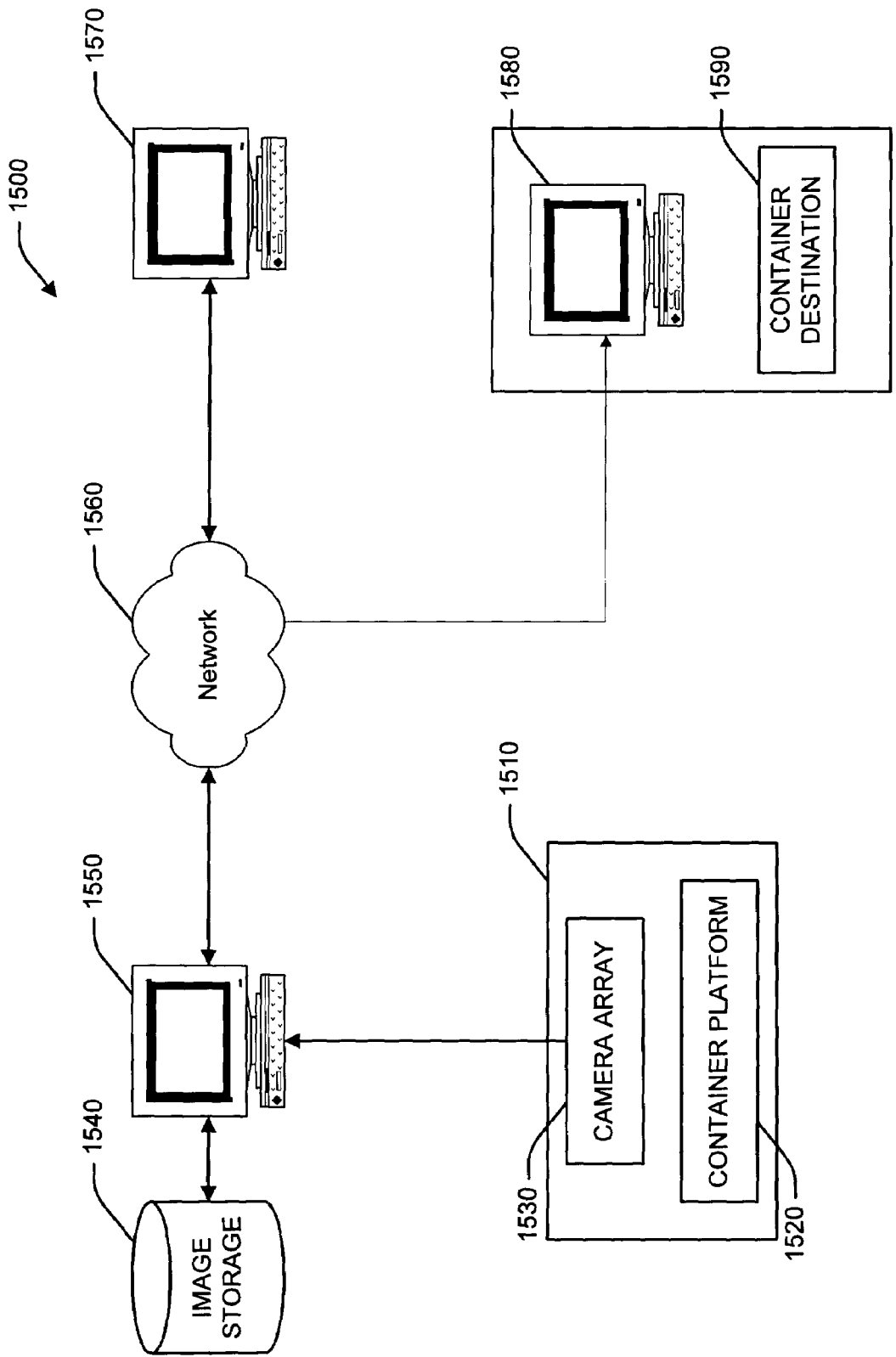
FIG. 15 illustrates a system for analyzing shipments 1500. The system 1500, includes a camera array 1530 and a container platform 1520 both located at a shipping location 1510. A computer 1550 is coupled to the camera array 1530 and receives multiple images of a shipment. The shipment has multiple sides. In one embodiment, images of a shipment are sent to the computer with different images showing different sides of the shipment. The computer 1550 and store the images in local storage 1540. The computer 1550 can also transmit the images through a network 1560 to a server 1570. Once the shipment reaches a destination 1590, a local computer 1580 can access the images from the server 1570 through the network 1560. In an alternate implementation, the images are sent from the computer 1550 to the local computer 1580 through the network 1560. In another alternate embodiment, the images or an identification of the images, for example a URL corresponding to the location of the images on the Internet, are loaded onto an electronic memory that is coupled to the shipment 1500, which can be a container. One form of coupled is to attach the electronic memory to the outside of the shipment. Another form of coupling is to include the electronic memory inside the shipment.
Figure 16:
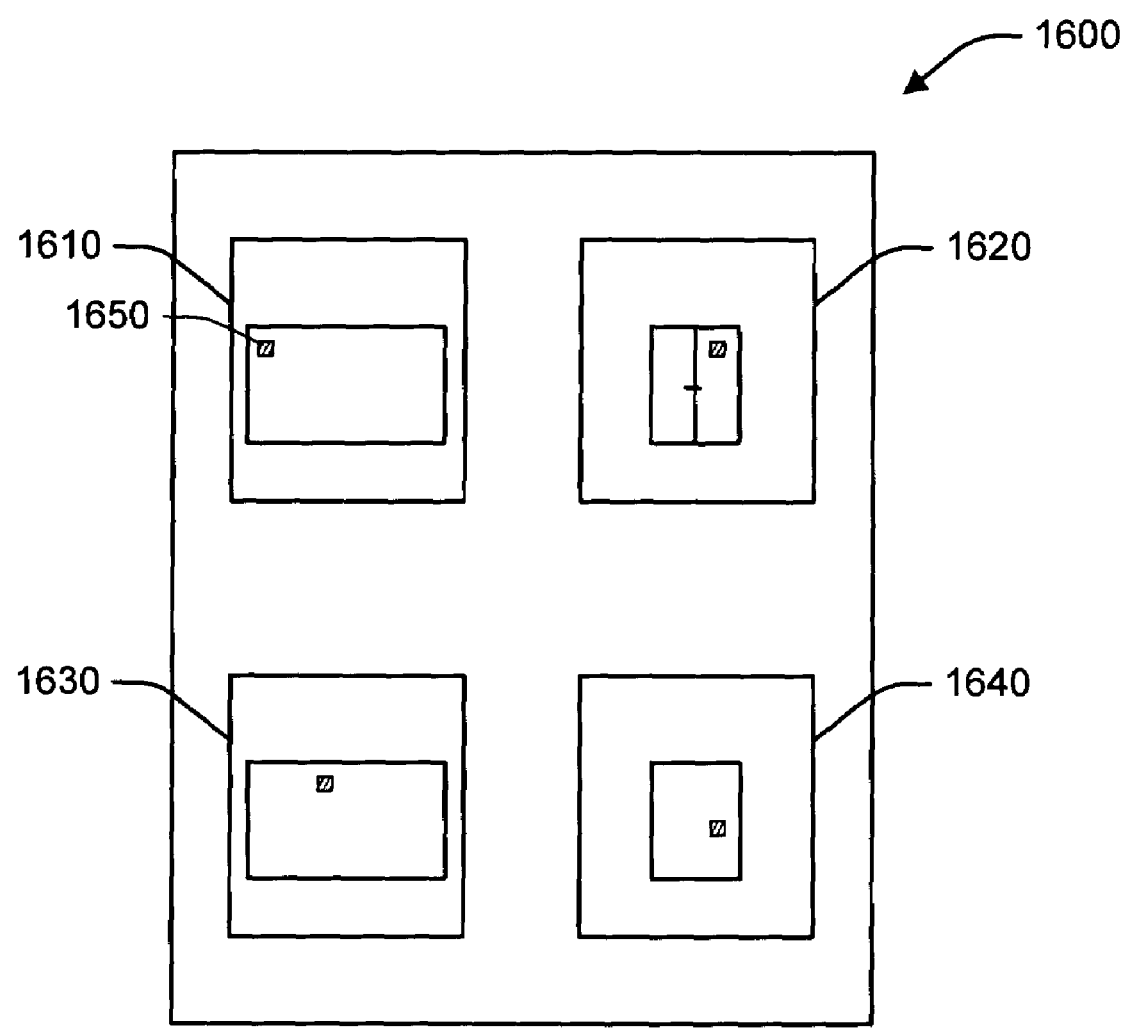

FIG. 16 illustrates a container imaging product 1600. In the particular embodiment shown, four images 1610, 1620, 1630, 1640 of the container are included. Each image shows a view of a different side of the container. Each image includes a different symbol 1650 as discussed in FIG. 13. One image 1620 shows a view that includes the container access and can include a seal mounted on the container access. Another image 1640 shows a side of the container opposite the access side shown in 1620. In one embodiment, the images are stored in electronic form and are coupled to the container. For example, a seal mounted on the access surface of the container can include flash memory storing the images. The product is a communication of symbols associated with particular sides of the shipment.

DESCRIPTION OF THE PREFERRED EMBODIMENTS

Bills of Lading

Figure 1:
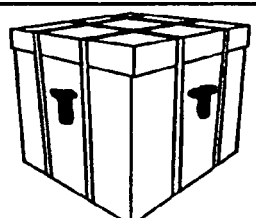
FIG. 1 is an elevation view of the front side of a preferred embodiment of a bill of lading in accordance with an implementation of the present invention.

Referring now to the drawings by numerals of reference, there is shown in FIG. 1, an example of a bill of lading 10 in accordance with an implementation of the present invention. The bill of lading 10 is a printed paper document of title issued by a consignor that evidences the receipt of goods or personal property for shipment by a commercial carrier. The bill of lading 10 is a printed form having the following sections, which are filled in by handwritten or typed words and numerals (or is computer generated): the name and address of the carrier 11, the consignee 12, the shipper 13, and the billing address 14. The form has sections for: the date shipped 15, the shippers account number 16, the purchase order number 17, the manner of payment 18, and any special instructions 19; and sections for the shippers signature and date 20, the carrier's signature and date 21, and a section for placement of a PRO label 22.

The bill of lading form 10 also has a section that is also filled in by handwritten or typed words and numerals (or is computer generated) that identifies the goods or personal property that is being shipped, usually with headings for: the number of pieces 23, whether its is hazardous material 24, the kind of package, description of articles, special marks and exceptions 25, the class 26, the weight 27, and the rate 28. The bill of lading can also include a pre-printed certification sentence that reads: "THIS IS TO CERTIFY THAT THE ABOVE-NAMED MATERIALS ARE PROPERLY CLASSIFIED, DESCRIBED, PACKAGED, MARKED AND LABELED, AND ARE IN PROPER CONDITION FOR TRANSPORTATION ACCORDING TO THE APPLICABLE REGULATIONS OF THE DEPARTMENT OF TRANSPORTATION."

In addition to the sections described above, the bill of lading form 10 of an implementation of the present invention also has a section that includes one or more photographic images 29 of the shipment, as it appears when prepared for shipment. For example, shipment can consist of 10 cardboard boxes on a wooden pallet, which has been shrink-wrapped and strapped, and other visible markings can be applied to the exterior of the shrink wrap. The photographic images 29 can comprise one or more photograph images that show the top, bottom, and all four sides of the shipment. These same photographic images would be placed on at least one negotiable copy and at least one nonnegotiable copy of the bill of lading.

In a preferred embodiment, the photographic images are taken with a digital color camera and downloaded to a computer. Alternatively, the photographic images are taken with a film color camera, developed, and scanned into a computer If the document is a preprinted form, the images can be printed onto the form, onto a label, or supplemental pages, that is/are then affixed or attached to the form. If the document is available as a template on a word processing program, the images can be electronically cut and pasted into the appropriate section of the document via the word processor, and then the whole document, with additional pages as needed, is printed. It should be understood that, in the case of bills of lading, that one negotiable and at least one nonnegotiable bill of lading can be produced (at least 2 pages in total). The other sections of the document and particulars of the shipment can be filled in by hand on both documents using carbon paper, carbonless copy paper, or by entering the information via the word processing program.

The photographic images 29 are placed on the bill of lading 10 by the consignor or shipper of the goods or personal property. When the commercial carrier arrives to pick up the shipment, he compares the photographic images on the bill of lading to the actual shipment. When he is satisfied he places a tracking label onto both the negotiable and nonnegotiable bills of lading and to the shipment itself. The commercial carrier makes sure that the consignor has signed the negotiable bill of lading and he signs the nonnegotiable bill of lading which he gives to the consignor before leaving with the shipment. The consignor or the commercial carrier can then e-mail, post on a web site, or otherwise deliver a scanned version or photocopy of the bill of lading 10 to the consignee or intended recipient, so that when the actual shipment arrives, they can visually inspect the shipment as it appears on arrival and compare it to the photographic images on the copy of the bill of lading before the signing the delivery receipt and accepting the shipment. For security purposes, the consignor or the commercial carrier can e-mail or otherwise deliver a scanned version or photocopy of the bill of lading to other interested security-minded parties.

Thus, the present bill of lading provides the shipper with further proof of what he shipped, and the condition of the shipment when it was shipped, and allows the recipient to detect discrepancies between what was shipped and what was received, and changes in the condition of the shipment or damage that may have occurred during transit, and thereby ascertain whether or not the shipment was pilfered or tampered with, and whether such pilferage and/or tampering took place before or after the commercial carrier took possession of the shipment, and would indicate whether or not the commercial carrier should be held responsible for the pilferage and/or tampering. Depending upon the class of goods and goods that pose a potential security or health hazard, other interested security-minded parties may be notified that the shipment may have been tampered and that a potential security threat or health hazard may exist.

Because "a picture is worth a thousand words", it should be understood, that depending upon the detail and content of the photographic images, that the written description may be either be eliminated or shortened to include only a reference to the type of commodity being shipped.

Ocean Bill of Lading

In international trade where goods, products or property are shipped via ocean an international carrier issues an ocean bill of lading. This is a contract between the international carrier and the shipper (exporter) that requires transport of goods, products or property to a specific foreign country or port. In cases other than when the shipping company issues an "express" ocean bill of lading, the importer (or his agent) presents the shipping line with at least one original copy of the ocean bill of lading in order for the importer to arrange the pick-up of the shipment.

Figure 2:
FIG. 2 is an elevation view of the front side of a preferred embodiment of an ocean bill of lading in accordance with an implementation of the present invention.

FIG. 2 shows an example of an ocean bill of lading 30 in accordance with an implementation of the present invention. The ocean bill of lading 30 is a printed paper form having the following sections, which are filled in by handwritten or typed words and numerals (or computer generated): the name and address of the carrier 31, the consignee 32, the shipper 33, and the name and address of the delivery agent 34, and party to be notified 35. The form has sections for: the place of receipt/pre-carriage 36, the place of receipt 37, the vessel 38, port of loading 39, port of discharge 40, place of delivery 41, and the location at which freight charges are payable 42; and sections for insurance information 43, for information related to freight and charges 44, and a receipt section 45 to be signed by the delivery agent.

The ocean bill of lading form 30 also has a section that is also filled in by handwritten or typed words and numerals (or computer generated) that identifies the goods or personal property that is being shipped, usually with headings for: special marks and numbers 46, number of packages 47, the kind of package, description of articles, the class 48, the weight 49, and the measurements 50.

In addition to the sections described above, the ocean bill of lading form 30 of an implementation of the present invention also has a section that includes one or more photographic images 51 of the shipment, as it appears when prepared for shipment. For example, shipment may consist of 100 cartons of goods that are contained in a shipping container, and other visible markings may be applied to the exterior of the container. The photographic images 51 may comprise one or more photograph images that show the top, bottom, and all four sides of the shipment or container. These same photographic images would be placed on at least one negotiable copy and at least one nonnegotiable copy of the ocean bill of lading 30.

After obtaining an endorsement of the international carrier, the shipper would send at least one original copy of the ocean bill of lading to the importer who would present it to the shipping line to pick up the shipment. Again, by knowing what the shipment looked like, the importer or his agent could more easily detect pilferage and/or tampering. A scanned version of the ocean bill of lading may also be e-mailed, posted on a web site, or otherwise delivered to port authority officials, a customs agent, or other interested security-minded parties, so that when the actual shipment arrives, they can visually inspect the shipment as it appears on arrival and compare it to the photographic images on the copy of the bill of lading to detect whether tampering or pilferage may have occurred or if the shipment may pose a potential security or health hazard.

With regard to bills of lading (ocean or otherwise), in instances where goods or property is shipped in a cargo container, a numbered security seal can be put on the outside of that shipping container. The container number and seal number can be noted on the bill of lading. However, criminal elements and others who would want to tamper with the contents of the container could break the seal and replace it with another one with the same number, or, they could replace an entire shipping container that used the same container number markings. The photographic images of the shipping container included on the bill of lading can make these "counterfeit" shipping containers easier to detect. Another advantage of some implementations of utilizing the present photographic images of a cargo container is that close-up photographic images can be made to show precisely what type of seal was used to close it up and the condition of the ring or rings that were attached to the container into which the seal was inserted. This can make it more difficult for a criminal to replace the seal with a counterfeit one, to repair a broken seal and/or to repair the ring or rings into which the seal is inserted.

In one implementation, when shipping a full trailer load of goods, or when the goods are shipped in a cargo container, the photographic images on the domestic or ocean bill of lading not only include photos of the trailer tailgate or cargo container, but also include at least one photo of the condition of the inside of the trailer or cargo container just before it is closed and sealed. This would allow the consignee (or law enforcement) to see what the shipment should look like when they first open the doors of the container or trailer, and to notify the appropriate parties if tampering and/or pilferage appears to have taken place.

Tracking Label

Figure 3:
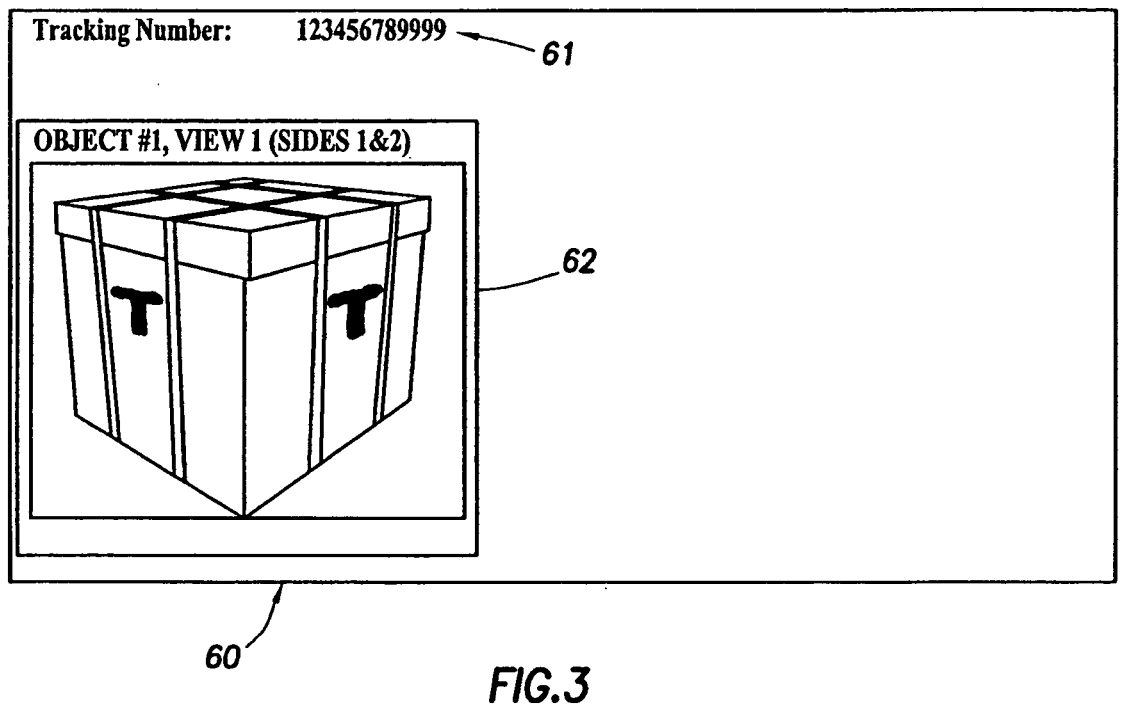
FIG. 3 is an elevation view of the front side of a preferred embodiment of a tracking label in accordance with an implementation of the present invention.

As described above, when a commercial carrier arrives to pick up a shipment, he places a tracking label onto both the negotiable and nonnegotiable bills of lading. FIG. 3 shows an example of a tracking label 60 in accordance with an implementation of the present invention. The tracking label 60 has a tracking number 61 (with or without a barcode), and also includes one or more photographic images 62 of the shipment, which is then applied to the bill of lading copies and/or the shipment itself. Typically, the shipper would take one or more photographs of the goods or personal property that is being shipped (after it is packed) and would then print the labels that bear the photographic images of the shipment. These labels are then applied to the bill of lading copies and/or to the shipment itself.

Photograph Receipt Chart Form

Figure 3A:
FIG. 3A is an elevation view of the front side of a preferred embodiment of a photograph receipt chart that can be used in conjunction with conventional shipping documents that are prepared in accordance with an implementation of the present invention.

FIG. 3A shows a photograph receipt chart form 63 that can be used in conjunction with conventional shipping documents or with single or multiple handling unit shipments that utilize the photographic documentation system. This form is a chart having a plurality of rows and columns, wherein the rows identify the object (carton) numbers and the columns identify the different views of the respective carton by its view number (side number). The corresponding photographic images 62 of those views are disposed in the appropriate cell. The object(s) themselves can also be marked with identifying information such as box number and side number. This chart can be accompanied by standards and instructions that would tell the user of the invention where to place the different photographs taken. Extra pages containing this chart may be combined depending upon the number of handled units. The chart can be used alone or included in a bill of lading and/or other more comprehensive shipping documents.

Delivery Receipt

Figure 4:
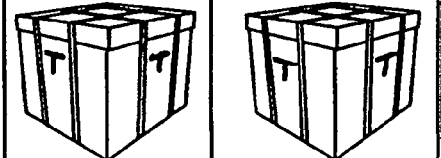
FIG. 4 is an elevation view of the front side of a preferred embodiment of a delivery receipt in accordance with an implementation of the present invention.

FIG. 4 shows an example of a delivery receipt 64 in accordance with an implementation of the present invention. The delivery receipt 64 is a paper document, usually generated by the commercial carrier or his agent prior to the carrier or agent making delivery of the shipment to the consignee or intended recipient, which provides evidence of the delivery. The delivery receipt 64 is a printed form having sections, which are filled in by handwritten or typed words and numerals (or computer generated) for: the name and address of the carrier 65, the consignee 66, the shipper 67, the shipper's account number 68, a PRO label number 69 and/or or tracking number 70, the date shipped 71, and any special delivery instructions 72. The delivery receipt 64 also has a section that is filled in by handwritten or typed words and numerals, that are typically copied from the bill of lading, that identifies the goods or personal property that is being shipped, usually with headings for: the number of pieces 73, whether its is hazardous material 74, the kind of package, description of articles, special marks and exceptions 75, the weight 76, the rate 77, and the charges 78.

At the bottom of the delivery receipt, there is a section for: the number of pieces delivered 79, date of delivery 80, time of delivery 81, delivery driver's signature 82, recipient' signature and name 83; and section with a certification sentence that reads: "RECEIVED ABOVE PROPERTY IN GOOD CONDITION", which may be signed by the recipient; and may also include a statement that reads: "STRETCHWRAP INTACT", with "YES" and "NO" check boxes which the recipient may check when accepting the shipment.

In addition to the sections described above, the delivery receipt form 64 of an implementation of the present invention can also have a section that includes one or more photographic images 84 of the shipment, as it appears when prepared for shipment. The photographic images may comprise one or more photograph images that show the top, bottom, and all four sides of the shipment. These photographic images 84 may be the same as those (29) used on the bill of lading 10.

Alternatively, rather than having photographic images 84 on the front side of the delivery receipt form, the photographic images may be placed on the back side, or a scanned version or photocopy of the bill of lading 10 bearing the photographic images, as described above may be placed on the back side of the delivery receipt. In these embodiments, the front side of the delivery receipt would contain only the sections with the written or typed descriptions.

The present delivery receipt provides the commercial carrier or shipper with proof of what the shipment was, and the condition of the shipment when it was picked up, and allows the recipient to detect discrepancies between what was shipped and what was received, and changes in the condition of the shipment or damage that may have occurred during transit, and thereby ascertain whether or not the shipment was pilfered or tampered with, and whether or not this pilferage and/or tampering took place before or after the commercial carrier took possession of the shipment. Depending upon the class of goods and goods that pose a potential security or health hazard, other interested security-minded parties may be notified that the shipment may have been tampered and that a potential security threat or health hazard may exist.

It should be understood that, in some instances, the delivery receipt and bill of lading may be combined in one document. For example, when household or business property is being moved by a moving company, or when a company or business organization is transporting their own goods to another location.

Delivery Order

Figure 5:
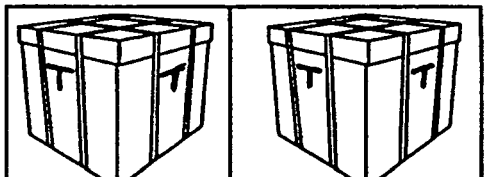
FIG. 5 is an elevation view of the front side of a preferred embodiment of a delivery order in accordance with an implementation of the present invention.

FIG. 5 shows an example of a delivery order 85 in accordance with an implementation of the present invention. The delivery order 85 is a paper document form, containing written instructions, given by an entity (e.g., an importer, freight forwarder, or trucking company) to a trucking company to move freight from a particular point (e.g., a warehouse or a port) to another point (e.g., the consignee).

The delivery order 85 has sections, which are filled in by handwritten or typed words and numerals (or computer generated) for: the name and address of the carrier 86, the shipper 87, the shipper's account number 88, a bill of lading or airway bill number 89, the location of the shipment 90 and the origin/destination port 91, the arrival/departure date 92, the in-transit number 93, the house bill of lading number 94, the sub-house bill of lading number 95, the entry number 96, and a customer reference number 97, to whom the delivery is for 98, and the route 99. The delivery order 85 also has a section that is also filled in by handwritten or typed words and numerals (or computer generated), that are typically copied from the bill of lading, that identifies the goods or personal property that is being shipped, usually with headings for: the number of pieces 100, the kind of package, description of articles and special marks and exceptions 101, the weight 102, and a section regarding charges 103 (pre-paid/collect). There is also a section for: the delivery driver's signature 104, and a receipt section for the recipient' signature, date and time 105.

In addition to the sections described above, the delivery order form 85 of an implementation of the present invention has a section that includes one or more photographic images 106 of the shipment, as it appears when prepared for shipment. The photographic images 106 may comprise one or more photograph images that show the top, bottom, and all four sides of the shipment. These photographic images 106 may be the same as those (29) used on the bill of lading 10.

Alternatively, rather than having photographic images on the front side of the delivery order form, the photographic images may be placed on the back side, or a scanned version or photocopy of the bill of lading 10 bearing the photographic images, as described above may be placed on the back side of the delivery receipt. In these embodiments, the front side of the delivery receipt would contain only the sections with the written or typed descriptions.

As described above, in domestic trucking a bill of lading covers the handing over of the physical possession of the shipment from the shipper to the trucking company (where both sign on that document). Later the trucking company can issue a "delivery order and/or delivery receipt" internally for one of their own driver's to move freight from their own warehouse to the consignee and the consignee will also have to sign on the delivery order which functions as the receipt. The original bill of lading is not necessarily the document that the trucking company arrives with when it makes the ending delivery to the consignee; instead, they can arrive with the delivery order/receipt, which can be signed by the consignee upon final delivery.

In international shipping an importer or his agent can issue a delivery order to a trucking company to pick up a shipment at the port (or some nearby warehouse) to make delivery to the consignee. In those instances, the delivery order would have a receipt section for the consignee to acknowledge receipt of the freight.

In both cases above, the inclusion of one or more photographic images of what the shipment looked like when it first was picked up at the shipper's location would help the driver and the ultimate consignee know whether tampering or pilferage has occurred. The photographic images on the delivery order allow both the driver who picks up the freight and the consignee to see what the shipment should look like. The photographic images on the delivery order, in the case of an import coming into the port would presumably come from the original bill of lading and/or from the original exporter. In the case of a domestic shipment the photographic images would presumably come from the original bill of lading, the shipper, the trucking company and/or a web site where it has been posted by the shipper or trucking company.

Warehouse Receipt

Figure 6:
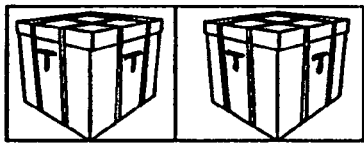
FIG. 6 is an elevation view of the front side of a preferred embodiment of a warehouse receipt in accordance with an implementation of the present invention.

FIG. 6 shows an example of a warehouse receipt 107 in accordance with an implementation of the present invention. The warehouse receipt 107 is a paper document form, containing written instructions, given by an entity (e.g., an importer, freight forwarder) that is used to acknowledge possession of the personal property or goods being stored in a warehouse and, like the other documents, it describes, in written words, the goods or personal property that are being stored.

The warehouse receipt 107 has sections, which are filled in by handwritten or typed words and numerals (or computer generated) for: the name and address of the owner of the goods 108, the name and address of the warehouse 109, and the warehouse receipt number 110. The warehouse receipt 107 also has a section that is also filled in by handwritten or typed words and numerals (or computer generated), that identifies the goods or personal property that is being stored, usually with headings for: the number and kind of packages 111, description of articles, special marks and numbers 112, the weight 113, and the measurements 114. At the bottom of the warehouse receipt, there is a certification sentence that reads: "RECEIVED FOR STORAGE AT THE RATE OF $XX PER DAY, and section to be signed by the warehouse representative 115, and the place and date of issued of delivery 116.

In addition to the sections described above, the warehouse receipt form 107 of an implementation of the present invention also has a section that includes one or more photographic images 117 of the shipment, as it appears at the time of arrival at the warehouse. In typical use, when an owner of the goods or personal property brings the property to a warehouse for storage, the warehouse personnel would photograph the property and would incorporate, directly or indirectly, these photographic images in the warehouse receipt. At the time of the pick-up of the goods or property its condition would be compared to the photographic images as it appeared at the time of arrival at the warehouse.

Air Bills

Figure 7:
FIG. 7 is an elevation view of the front side of a preferred embodiment of an airway bill in accordance with an implementation of the present invention.

FIG. 7 shows an airway bill 118 in accordance with an implementation of the present invention. Most commercial air courier services such as: the Express Mail service of the United States Postal Service, Federal Express, United Parcel Service, DHL, Airborne, and many others utilize a multi-part form, similar to the bill of lading, known as an "air bill" or "airway bill". The airway bill 118 of an implementation of the present invention is a printed paper form having the following sections, which are filled in by handwritten or typed words and numerals (or computer generated): the name and address of the carrier 119, the airway bill number 120, the shipper 121, the consignee 122, the date 123, the party to be notified 124, and the location at which freight charge are payable 125. The form also has a section for insurance information 126, and a receipt section 127 to be signed by the carrier.

The airway bill form 118 also has a section that is also filled in by handwritten or typed words and numerals (or computer generated) that identifies the goods or personal property that is being shipped, usually with headings for: special marks and numbers 128, number of packages 129, the kind of package, description of articles 130, the weight 131, and the measurements 132.

In addition to the sections described above, the airway bill form 118 of an implementation of the present invention has a section that includes one or more photographic images 133 of the shipment, as it appears when prepared for shipment. In the case of air bills or airway bills, an original copy of the airway bill form is sent to the consignee with the shipment.

Shipping Label

Figure 8:
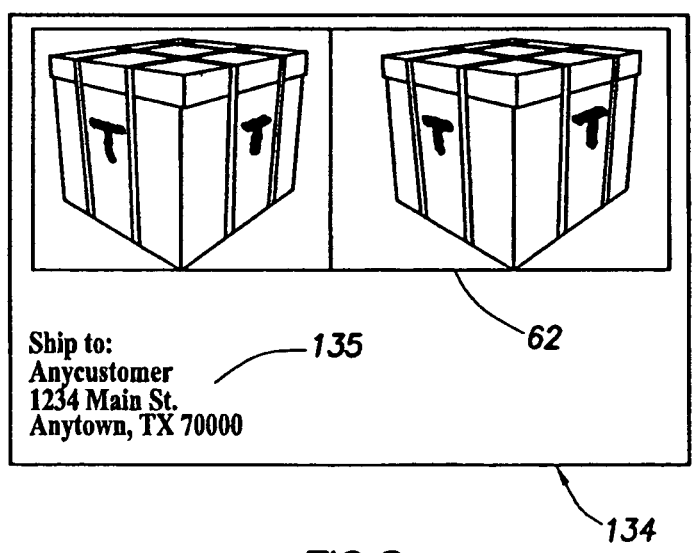
FIG. 8 is an elevation view of the front side of a preferred embodiment of a shipping label in accordance with an implementation of the present invention.

FIG. 8 shows an example of a shipping label 134 in accordance with an implementation of the present invention, which is similar to the tracking label 60 described above (FIG. 3). The shipping label 134 would be attached directly to the freight being shipped, and in addition to the photographic images 62, has the name and address of the party to whom the delivery is to be made 135, and, depending upon the application, may or may not include the tracking number and/or barcode. A similar labeling system may also be used for product identification in large companies, hospitals, and other settings wherein large pieces of equipment may be identified with a number and a hard to remove labels.

Confirmation of Shipment

Figure 9:
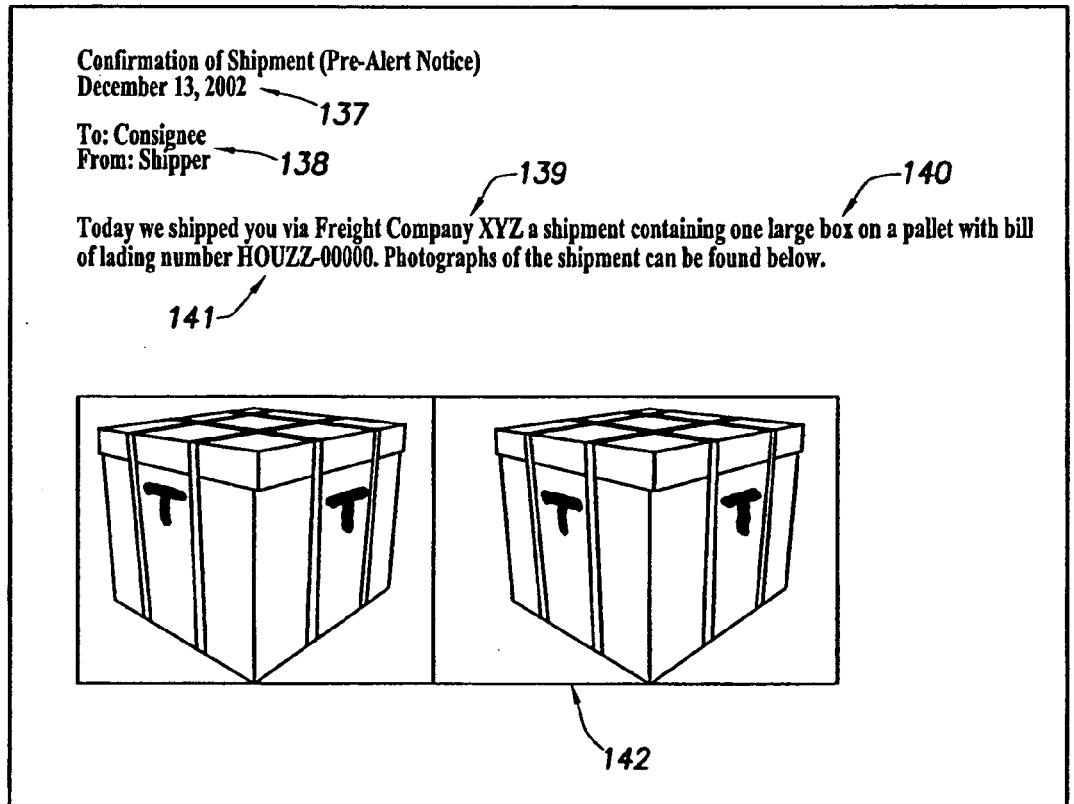
FIG. 9 is an elevation view of the front side of a preferred embodiment of a confirmation of shipping form in accordance with an implementation of the present invention.

As discussed above, a scanned version of the bill of lading may be e-mailed, posted on a web site, or otherwise delivered from the consignee to the shipper and/or to port authority officials, a customs agent, or other interested security-minded parties. FIG. 9 shows an example of a confirmation of shipping notice 136 that may be sent to said parties. The notice is in the form of a letter which indicates, in writing: the date of shipment 137, to whom it was shipped 138, how it was shipped 139, and describes the type of package 140, and the bill of lading number 141. In addition, the letter bears one or more photographic images 142 of the shipment, so that when the actual shipment arrives, or is inspected, the recipient or parties of interest can visually inspect the shipment as it appears on arrival and compare it to the photographic images 29 on the copy of the bill of lading 10 to detect whether tampering or pilferage may have occurred or if the shipment may pose a potential security or health hazard.

Although in the previous examples the actual physical shipment is compared to the photographic images of what it should look like, it should be understood that in some situations, two or more sets of photographic images or documents bearing the same may be used. For example, when an appropriately trained inspector does not necessarily have easy access to the shipment (or the extra time), photographic images with identifying information of what reached each destination (e.g., a tracking number) taken at a place or places where a freight shipment initially departs, where the shipment changes hands during transit, or at the destination, may be sent to the inspector for comparison. The inspector may then compare two or more sets of the photographic images and identifying information and notify others of the results of the comparison.

Supplemental Photographic Receipt System

Figure 9A:
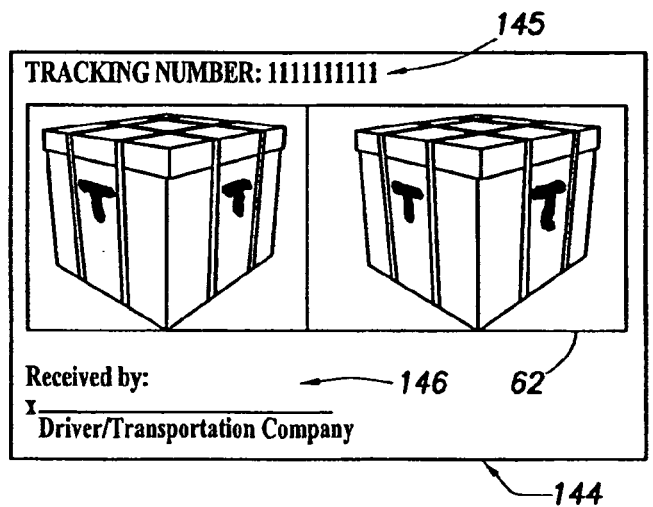
FIG. 9A is an elevation view of the front side of a preferred embodiment of a supplemental photographic shipping receipt form in accordance with an implementation of the present invention.

For various reasons, participants in a shipping transaction may prefer to continue to use the traditional documents that they currently use in shipping transactions while still enjoying the benefits of the invention described herein. This can be accomplished by system whereby the consignor after packing a shipment prepares a traditional bill of lading and also a supplemental photographic receipt 144, as shown in FIG. 9A. The photographic receipt 144, is similar to the tracking label described above and, at a minimum, includes words or alphanumeric or other data 145 to specifically identify a particular shipment (e.g., tracking number, bill of lading number, the date with both names of consignee and consignor, air bill number, etc.), and a section bearing one or more photographic images 62 of the goods or property that are being shipped clearly showing the condition of the goods or property at the time of pick up at the point of origin. A receipt section 146 to be signed by the driver may optionally be included.

In a preferred embodiment, the driver (after comparing the photographs to the actual freight) would sign this supplemental receipt 144 (just as he signs on the nonnegotiable bill of lading) and would give the receipt to the shipper. The transportation company may also request that the driver leave the shipper's premises with not only the freight and the negotiable bill of lading, but also with a copy of the supplemental photographic receipt 144 that the shipper has signed. The shipper (and/or transportation company) can then send (via email, regular mail, posting to a web site, by attaching physically or electronically to a subsequently used shipping document, or otherwise) to the consignee or other interested party (e.g., law enforcement) the photographs used in this supplemental photographic receipt so that the consignee (or other interested party) can compare the photographic images with the goods or property, and the condition thereof, upon arrival at the destination (or at some point in between the origin and destination) for purposes of identification, authentication, verification and confirmation of the transaction and detection of any change in the condition of the goods or property.

Similar photographic receipts can be used in conjunction with other traditional transportation-related documents (and/or traditional documents of title) including but not limited to air bills, ocean bills of lading, delivery receipts, delivery orders, and warehouse receipts.

Non-consignor Generated Photographic System

In the method of utilizing the examples described above, the consignor is described as taking a few specific actions. However, other than specific situations where only a signature of the consignor is required, the term "consignor", as used herein, should be interpreted broadly to include his agents and representatives. For example, a representative of the transportation company (e.g., the driver who picks up the freight at the consignor's premise) may be the person who actually takes the photographs used in the bill of lading (or in any other shipping document or related receipt). Furthermore, one or more representatives of the transportation company may also perform or assist in one or more other tasks which thus far have been described as being carried out by the consignor (e.g., numbering the views, printing the photographs, adding the photographs to the bill of lading, printing the bill of lading, filling out the bill of lading, etc.).

Other parties who may also do one or more of these tasks (in addition to representatives of the transportation company who actually picks up the freight at the point of origin) include, but are not limited to, representatives of the freight forwarder, packing company, airline, ocean line, railroad, trucking company, law enforcement, port security personnel, and customs agents, and also professional photographers.

While, under the ideal situation, the initial photographs should be taken at the point of origin, it should be understood that other participants in the movement of the freight transaction (and/or law enforcement) may be the ones who take additional photographs for subsequent comparison or may be the ones who take the initial set of photographs. For example, a trucking company picks up the freight at the consignor's premise and only a traditional bill of lading is used (without any supplemental photographic receipt). At the request of the consignor, the trucking company, once the freight arrives at the terminal nearest the point of origin, may then photograph the freight and send the photographs to the consignor for verification that the photographs accurately reflect the condition of the freight at the point of origin. After obtaining that verification the trucking company would then use the photographs in accordance with the methods described previously herein (e.g., include them in the delivery receipt, send the freight to the consignee, etc.). Even if the consignor did not request that photographs be taken, the trucking company may choose to do this for purposes of internal control and/or in cases where another transportation company will make final delivery to the consignee.

Similarly, law enforcement officials may want to take photographs of a cargo container and/or its contents before it is loaded onto a ship at the port of origin, so that law enforcement at the destination port can compare the photographs with the actual cargo container and/or its contents when it arrives. With the frequent use of multinational crews on the ships that transport cargo containers, such a system would give law enforcement a valuable tool to combat tampering (and/or pilferage) which may occur onboard a ship.

Sequential Alphanumeric Freight View Identification System

The numbering of individual packages or boxes is very common in the prior art when shipping multiple package or box shipments. For example; individual units of a multiple box shipment are commonly labeled "Box 1 of 5", "Box 2 of 5", etc.

An implementation of the present invention utilizes a unique freight view identification system whereby the shipper adds alphanumeric data to the freight being shipped so that a subsequent viewer (e.g., consignee) can quickly compare the photographs of how the shipment looked at its initiation with the actual freight itself. Typically, each side of the freight in the photograph (other than the cargo container) is assigned a unique side number. This enables the shipper to make sure that he has taken all the right photographs and for subsequent viewers (e.g., the consignee, inspector, or law enforcement) to quickly and more accurately identify the camera views. The shipper adds machine and/or manually generated identification codes to the freight so that each view (i.e., camera angle) has a code included in it. However, it is best that at least some of each identification code is generated by hand and is written out by hand using a pen or other writing instrument, or painted or spray-painted. This way the identification code is similar to a signature on a check and is difficult to forge. The following are examples of a unique coding system for each view.

A sequential alphanumeric numbering system for each view (e.g., view 1, view 2, view 3, etc., or, view a, view b, view c, etc.) may be applied to the entire shipment of freight comprised of one or more "handling units". A "handling unit" may be a single box if it is not attached to any other box, or a unit of 10 boxes if they are physically connected together, or to a pallet.

A sequential alphanumeric numbering system for each handling unit, plus a sequential alphanumeric numbering system for each view (e.g., Unit1-view 1, Unit1-view 2, Unit1-view 3, etc., or, Unit1-view a, Unit1-view b, Unit1-view c, etc., may alternatively, be applied to the goods being shipped.

Still other view (or side) numbering systems would include but not be limited to the following sequences:

a) 1, 22, 333, 4444, 55555, . . .

b) A, BB, CCC, DDDD, . . .

c) Unit 1-1, Unit 1-22, Unit 1-333, Unit 1-4444, Unit 2-1, Unit 2-22, d) Unit 1-A, Unit 1-BB, Unit 1-CCC, Unit 1-DDDD, Unit 2-A, Unit 2-BB, . . .

e) Unit A-1, Unit A-22, Unit A-333, Unit A-4444, Unit A-1, Unit A-22, . . .

f) Unit 1-North, Unit 1-East, Unit 1-South, Unit 1-West, Unit 2-North, Unit 2-East, . . .

g) Unit A-North, Unit A-East, Unit A-South, Unit A-West, Unit B-North, Unit B-East, . . .
h) Unit 1-N, Unit 1-E, Unit 1-S, Unit 1-W, Unit 2-N, Unit 2-E . . .
i) Unit A-N, Unit A-E, Unit A-S, Unit A-W, Unit B-N, Unit B-E . . .
j) View 1, 12, 123, 1234, etc. . . .
k) 0, 1, 2, 3, 4, etc. . . .
l) 0, −1, −2, −3, etc. and
m) Apple, Boy, Cat, Day, etc. . . .

It should be understood that, depending upon the camera angle, each view could show one or more sides and the top of a handling unit; thus, some of the sides may not require the coding because the identification of the side is implied. It should also be understood that other coding methods whereby the views of each handling unit is assigned a unique code may be used.

OPERATION

Domestic Bill of Lading Example

Figure 10:
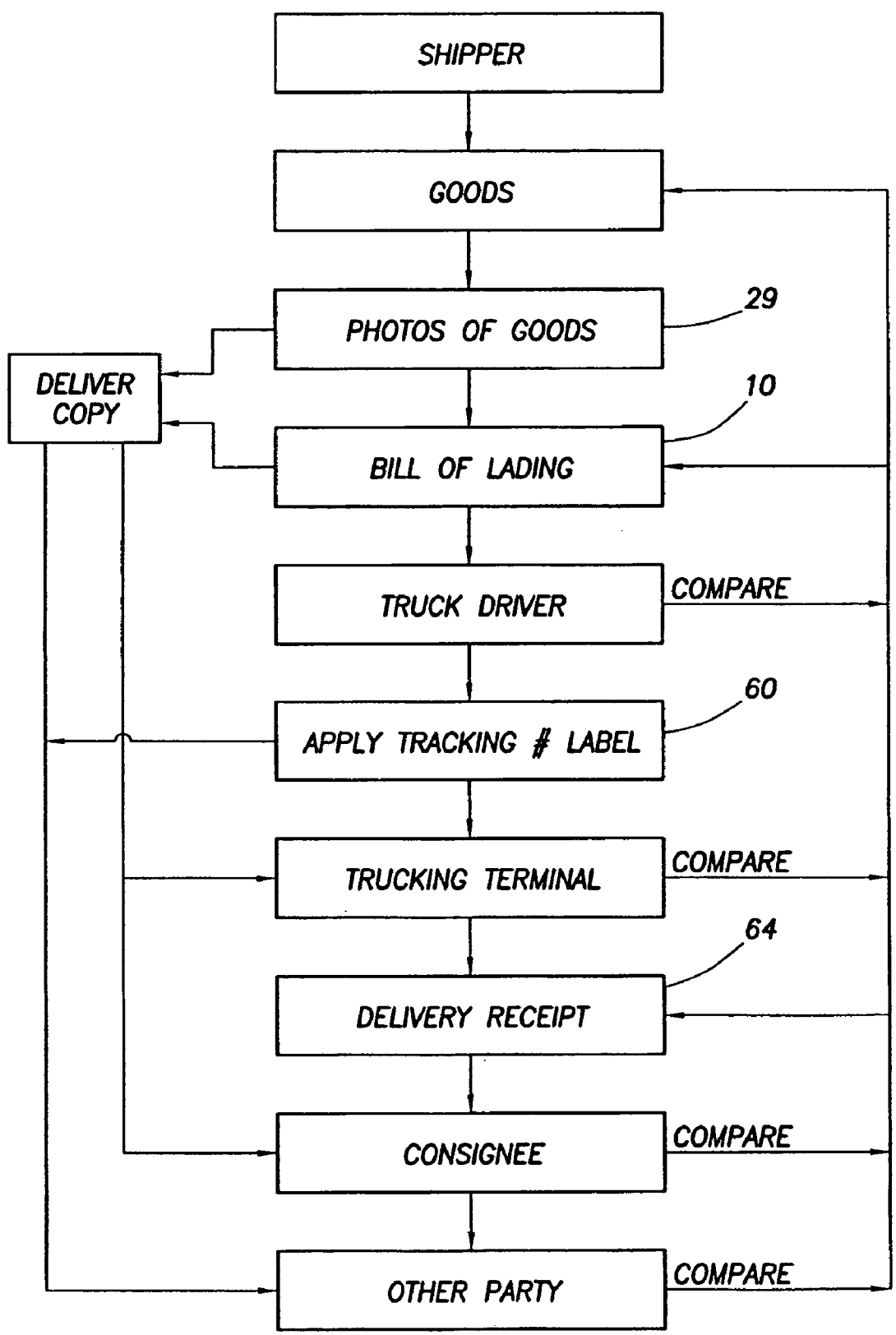
FIG. 10 is a flowchart showing schematically an example of how a bill of lading and other documents in accordance with an implementation of the present invention are used in a domestic shipping operation.

FIG. 10 is a flowchart showing schematically an example of how a bill of lading and other documents in accordance with an implementation of the present invention are used in a domestic shipping operation.

After the packed shipment has been photographed and the various views numbered, the photographic images 29 are placed on the bill of lading 10, as described herein, by the consignor or shipper of the goods or personal property. When the commercial carrier arrives to pick up the shipment, he compares the photographic images 29 on the bill of lading 10 to the actual shipment. When he is satisfied he places a tracking label onto both the negotiable and nonnegotiable bills of lading and to the shipment itself. The commercial carrier makes sure that the consignor has signed the negotiable bill of lading and he signs the nonnegotiable bill of lading which he gives to the consignor before leaving with the shipment. The consignor or the commercial carrier may then e-mail, post on a web site, or otherwise deliver a scanned version or photocopy of the bill of lading 10 to the consignee or intended recipient, so that when the actual shipment arrives, they can visually inspect the shipment as it appears on arrival and compare it to the photographic images 29 on the copy of the bill of lading before the signing the delivery receipt 64 and accepting the shipment. For security purposes, the consignor or the commercial carrier may e-mail, post to a web site, or otherwise deliver a scanned version or photocopy of the bill of lading to other interested security-minded parties.

Thus, the present bill of lading 10 provides the shipper with proof of what he shipped, and the condition of the shipment when it was shipped, and allows the recipient to detect discrepancies between what was shipped and what was received, and changes in the condition of the shipment or damage that may have occurred during transit, and thereby ascertain whether or not the shipment may have been pilfered or tampered with, and whether or not this pilferage and/or tampering took place before or after the commercial carrier took possession of the shipment, and would indicate whether or not the commercial carrier should be held responsible for the pilferage and/or tampering. Depending upon the class of goods and goods that pose a potential security or health hazard, other interested security-minded parties may be notified that the shipment may have been tampered with and that a potential security threat or health hazard may exist.

International Ocean Freight Example

Figure 11:
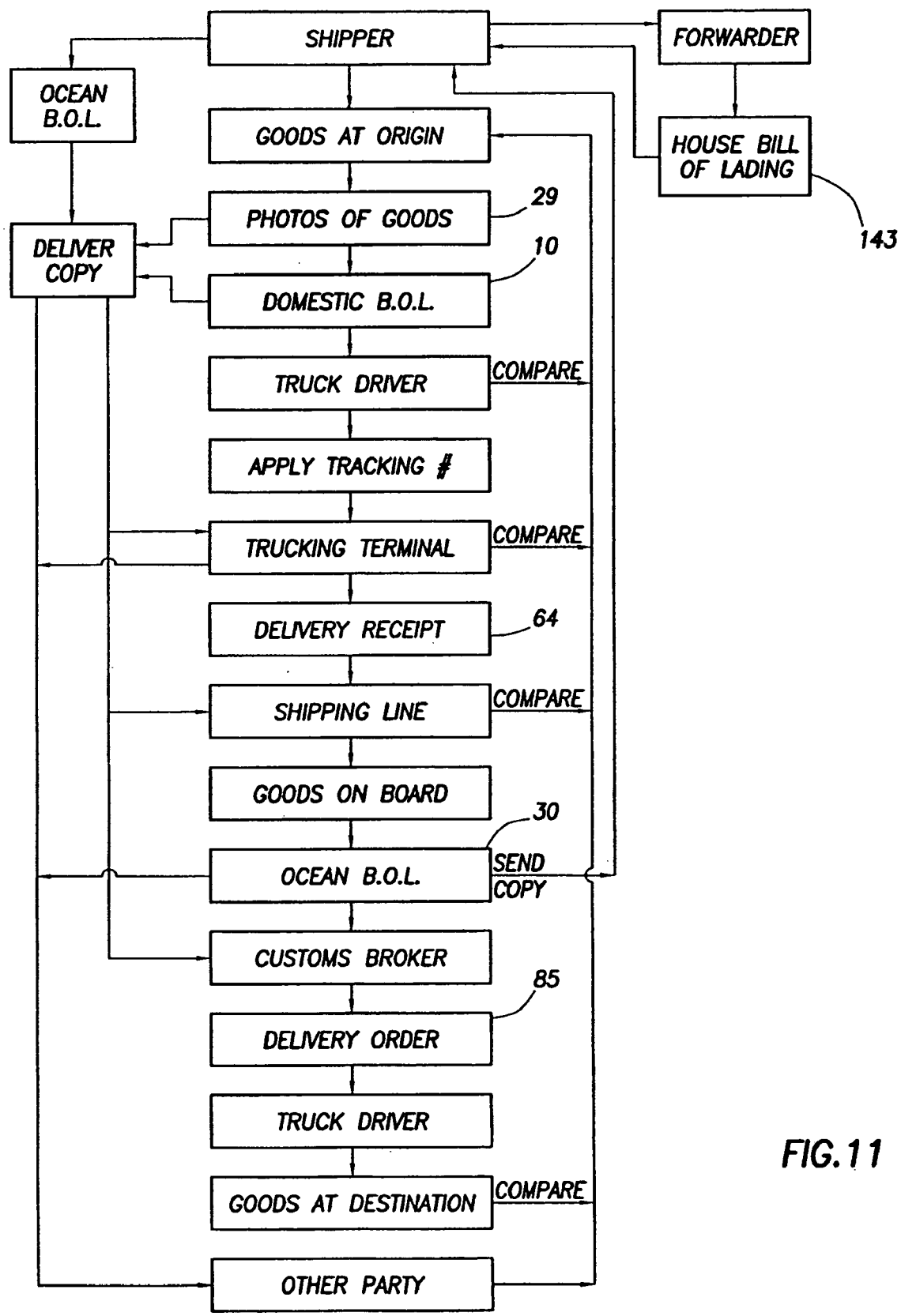
FIG. 11 is a flowchart showing schematically an example of how an ocean bill of lading and other documents in accordance with an implementation of the present invention are used in an international ocean freight shipping operation.

FIG. 11 is a flowchart showing schematically an example of how an ocean bill of lading and other documents in accordance with an implementation of the present invention are used in an international ocean freight shipping operation.

After packing an order, the shipper calls a freight forwarder and tells them that the shipper has a shipment ready to be exported. He gives the shipment details (e.g., consignee name and address, description of the freight, etc.) to the forwarder.

The freight forwarder makes a reservation with shipping line, and issues a "house" bill of lading 143 that confirms the routing of the shipment. This house bill of lading 143 does not contain a photograph of the freight, but is primarily used only to confirm the shipment details. The freight forwarder sends the house bill of lading to the shipper for review. Once confirmed, the forwarder (or shipper) calls a trucking company to pick up the freight and deliver it to the pier.

The shipper fills out the domestic bill of lading 10 (for movement of freight to a pier), numbers the handling units and the sides of the handling units, takes photographs of the freight, adds the photographs 29 of the freight to the bill of lading, signs the bill of lading, obtains the truck driver's signature on the bill of lading, and gives the driver the freight.

The trucking company issues a delivery receipt 64 for the personnel at the pier to sign. The trucking company also adds to the delivery receipt the photographs 29 that the shipper took (which were scanned from the bill of lading or which the shipper e-mailed or otherwise sent the trucking company).

The truck driver takes the freight to the pier. The person who receives the freight at the pier compares the condition of the freight to the photographs 29. If there are any differences they are noted on the delivery receipt 64. The pier person then signs the delivery receipt.

When the ship is available for loading, the freight is then loaded onto the ship. Before it is loaded, the personnel who load it compare its condition to the photographs 29 shown on the delivery receipt 64 (or to the photographs which the shipper has emailed or otherwise sent them). The shipping line then issues its own ocean bill of lading 30 covering the ocean voyage. The shipping line will add the photographs 29 of the freight to the ocean bill of lading that it issues. The photographs may come from the scanned version of the delivery receipt, from an email or otherwise from the shipper, or the shipping line (if they are certain that the condition of the freight is identical to when it left the shipper's warehouse) may take its own set of photographs.

The shipping line's ocean bills of lading 30 are send to the shipper. The shipper inspects the shipping line's ocean bills of lading 30 for accuracy, compares the photographs 29, and sends them to the consignee. The consignee gives at least one of the shipping line's bills of lading 30 to his customs broker. The ship transports the shipment to the destination port.

At the destination port, the customs broker obtains a customs release, gives one of the original ocean bills of lading 30 (issued by the shipping line) to the local office of the shipping line, which then releases the freight.

The customs broker also arranges for a freight release from the terminal operator, and issues a delivery order 85 to a local trucking company (for movement of the freight from the port to the consignee). The broker adds photographs 29 of the freight to the delivery order. The broker obtains the photographs of the freight by either scanning them from the ocean bill of lading 30 or from the consignee to whom the shipper sent the photographs via email or otherwise.

The driver from the trucking company goes to the port and compares the actual freight to the photographs 29 on the delivery order 85. If there are any problems with the freight, the driver lists them on the receipt that he signs at the port and, if appropriate, notifies the proper law enforcement or authorities.

The truck driver then delivers the freight to the consignee, who compares the condition of the freight to the photographs which the shipper sent him or which were contained in the ocean bill of lading. If there are any problems with the condition of the freight the consignee notes them on the delivery receipt 64 that he then signs.

International Air Freight Example

Figure 12:
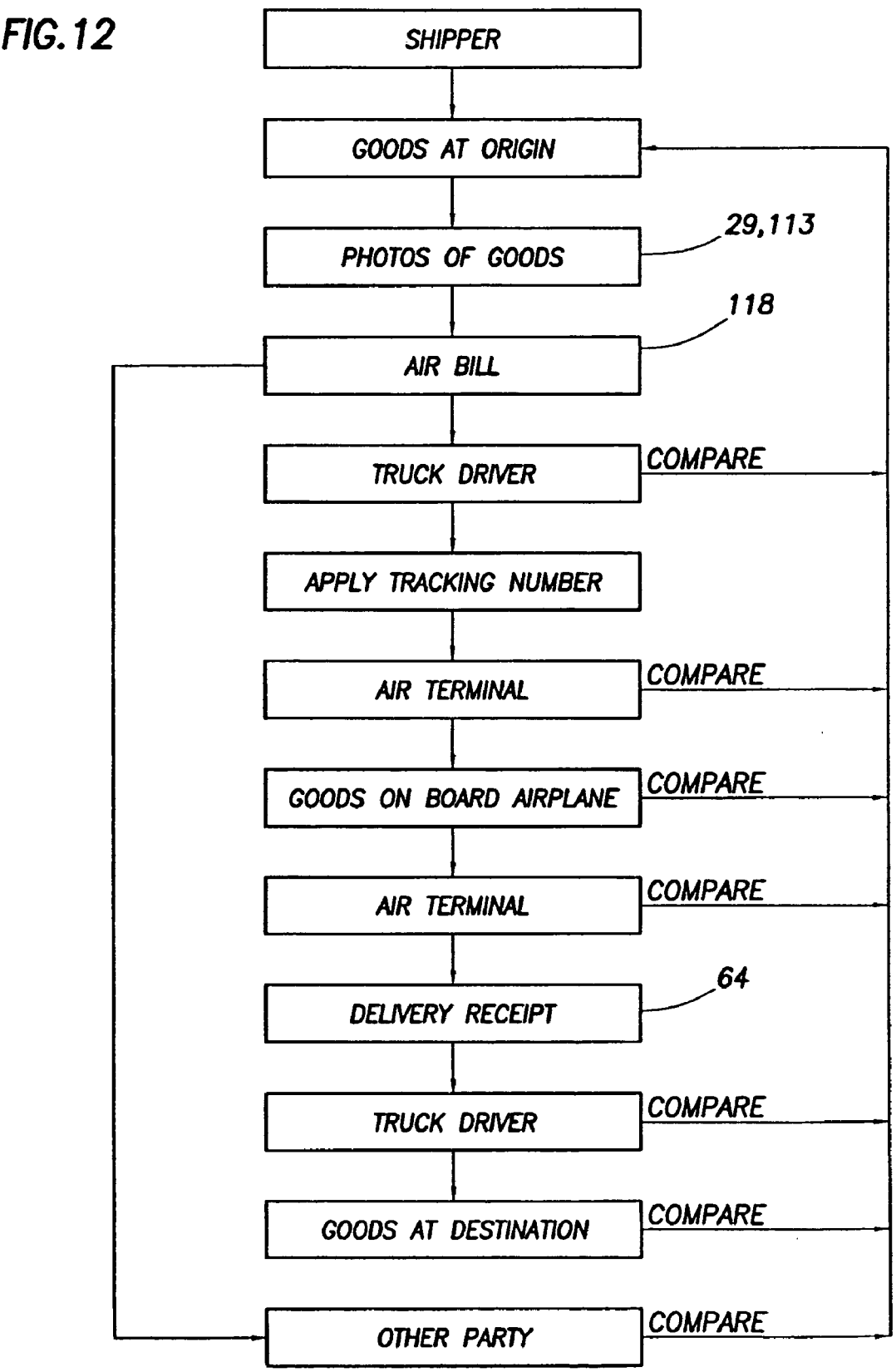
FIG. 12 is a flowchart showing schematically an example of how an air bill is used in accordance with an implementation of the present invention in an international airfreight shipping operation where the carrier provides door-to-door service.

FIG. 12 is a flowchart showing schematically an example of how an air bill 118 (FIG. 7) is used in accordance with an implementation of the present invention in an international air freight shipping operation where the carrier provides door-to-door service.

After packing an order, the shipper calls the air freight company to pick up the freight. The shipper fills out the air bill 118 (for movement of freight to the consignee), numbers the handling units and the sides of the handling units, takes photographs of the freight, adds the photographs 29,113 of the freight to the air bill of lading, signs the air bill 118, obtains the truck driver's signature on the air bill, and gives driver the freight (along with most of the original copies of the air bill).

The person who receives the freight at the air terminal compares the condition of the freight to the photographs 29,113. If there are any differences they are noted and, if appropriate, the proper law enforcement or authorities are contacted.

When the plane is available for loading, the freight is then loaded onto the plane. Before it is loaded, the personnel who load it compare its condition to the photographs 29,113 shown on the air bill 118 (or to the photographs which the shipper has emailed or otherwise sent them).

The plane transports the shipment to the destination port. At the destination port, the air freight company (or a specifically identified customs broker) obtains a customs release, issues a delivery receipt 64, and delivers the freight to the consignee.

The truck driver then delivers the freight to the consignee, who compares the condition of the freight to the photographs 29,113 which the shipper sent him or which were contained in the air bill 118 which accompanies the freight. If there are any problems with the condition of the freight the consignee notes them on the delivery receipt 64 that he then signs.

As has been pointed out above, in typical freight transportation transactions (movements of goods from consignor to consignee), the freight being shipped changes possession one or more times on the way to the consignee. Currently various forms, documents, and/or receipts facilitate each and every change of possession (e.g., bill of lading, delivery receipt, air bill, etc.). The various embodiments of the present invention described herein are at their simplest form designed to potentially be applied to one or more of the possession changes which take place in a single freight transportation transaction. While applying them for each and every possession change is the ideal, the inventions have significant value to both the recipient of the freight and the transferor of the freight (the person who gives the freight to the recipient) when applied to just a single possession change. This is because the recipient of the freight has clear evidence of the condition of the freight when it was handed over to him. That evidence may be useful if that recipient is subsequently accused of permitting someone to tamper with the freight while in his possession (particularly if the freight has already been tampered with).

Similarly, the transferor of the freight is then provided with clear evidence of the condition of the freight when he transfers possession to the recipient of the freight which would potentially be helpful in protecting him from liability associated with tampering and/or pilferage. While the conventional paper documents currently used in these transactions may provide evidence of liability, they are not nearly as good as photographic records of the freight that can best document the specific condition of the freight at the time of a possession change. The limitation of the currently used conventional documents (for each and every change of possession) is that they are limited to describing the freight only in words, which under the best circumstances can hardly ever describe all the details that a photograph can record. This is particularly a problem when the condition of the freight, after an act of tampering or pilferage, is such that it appears as if it is still fully described by the description in words and that no tampering or pilferage has occurred.

In using the present system and embodiments described herein, the photographs taken in anticipation of the next change of possession may be inserted in the next traditional document which would be used in that possession change, or in a supplemental receipt created for that next change of possession. The photographs may be obtained directly or indirectly from the original consignor, from a party who directly or indirectly assisted in any prior possession changes, or new photographs may be taken with a digital camera (or otherwise). The above-described types of documents are referred to herein as types of transfer documents.

Another significant advantage of the system and embodiments of the present invention, is that law enforcement may benefit from the use of the invention even if applied to a single possession change. This is because such use would again provide a clear record of the condition of the freight at a specific place and time. While not as helpful as diligent use of the invention at each and every possession change, this can be very helpful in spotting tampering or pilferage and would help in the determination of where and when such tampering might have occurred.

The present system may also be supplemented by attaching warning labels and/or notices to the freight (or to a shipping container) warning any would be criminals that the freight is protected by a photographic documentation system. Adding these type of labels and/or notices would help deter criminals from tampering and/or pilfering the freight.

The image used in the above-described documents can be identified in a number of ways. In addition to having the image included on the handling document, the shipment handling document can identify another document that contains the image and that document can be attached or separate from the shipment handling document. The shipment handling document can also identify the image by specifying a location of data that represents the image. Such data could include a particular storage device (e.g., a disk, CD or flash memory), a storage location on a data network (e.g., a URL on the Internet), or a particular entity that holds the data. A particular entity can also hold actual images rather than data representing an image. For example, a third party can work with both the shipper and the carrier/handler to receive and provide images or image data.

While this invention has been described fully and completely with special emphasis upon preferred embodiments, it should be understood that there are other implementations within the scope of the appended claims.

What is claimed is:

1. A method of comparing a container to a container imaging product comprising:

receiving a plurality of visible light images of a container which has six sides each of which is substantially rectangular, wherein a first image of the plurality of visible light images is of a first view of the container and includes a first symbol marked on a side of the container without physical damage and not a second different symbol; wherein a second image of the plurality of visible light images is of a second view of the container and includes the second symbol marked on a side of the container without physical damage and not the first symbol; wherein five or more sides of the container are visible in the images; and wherein at least one of the images depicts at least one substantially complete side of the container; and comparing the images of the sides marked with the first and second symbols to the container's sides marked by those same symbols to ascertain if tampering with the contents of the container has occurred, wherein the images shows that the first symbol is applied directly to the surface of the container without a label.

2. A method of comparing a container to a container imaging product comprising:

receiving a plurality of visible light images of a container which has six sides each of which is substantially rectangular, wherein a first image of the plurality of visible light images is of a first view of the container and includes a first symbol marked on a side of the container without physical damage and not a second different symbol; wherein a second image of the plurality of visible light images is of a second view of the container and includes the second symbol marked on a side of the container without physical damage and not the first symbol; wherein five or more sides of the container are visible in the images; and wherein at least one of the images depicts at least one substantially complete side of the container; and comparing the images of the sides marked with the first and second symbols to the container's sides marked by those same symbols to ascertain if tampering with the contents of the container has occurred, wherein the image shows that the first symbol is printed directly onto the container.

3. A method of comparing a container to a container imaging product comprising:

receiving a plurality of visible light images of a container which has six sides each of which is substantially rectangular, wherein a first image of the plurality of visible light images is of a first view of the container and includes a first symbol marked on a side of the container without physical damage and not a second different symbol; wherein a second image of the plurality of visible light images is of a second view of the container and includes the second symbol marked on a side of the container without physical damage and not the first symbol; wherein five or more sides of the container are visible in the images; and wherein at least one of the images depicts at least one substantially complete side of the container; and comparing the images of the sides marked with the first and second symbols to the container's sides marked by those same symbols to ascertain if tampering with the contents of the container has occurred, further comprising the step of receiving a plurality of images of a second container which only has six sides which are substantially rectangular wherein an image of a first view of the second container includes a first symbol and not a second different symbol; and an image of a second view of the second container, the second view includes the second symbol and not the first symbol, wherein five or more sides of the second container are visible in the images and wherein in the images the first and second symbols of the image's second container are substantially the same as the first and second symbols of the images of the first container, wherein in the images both the first and second containers are marked with identification of the same consignee and a different consignor.

4. A method of comparing a container to a container imaging product comprising:

receiving a plurality of visible light images of a container which has six sides each of which is substantially rectangular, wherein a first image of the plurality of visible light images is of a first view of the container and includes a first symbol marked on a side of the container without physical damage and not a second different symbol; wherein a second image of the plurality of visible light images is of a second view of the container and includes the second symbol marked on a side of the container without physical damage and not the first symbol; wherein five or more sides of the container are visible in the images; and wherein at least one of the images depicts at least one substantially complete side of the container; and comparing the images of the sides marked with the first and second symbols to the container's sides marked by those same symbols to ascertain if tampering with the contents of the container has occurred, further comprising the step of receiving a plurality of images of a second container which only has six sides which are substantially rectangular wherein an image of a first view of the second container includes a first symbol and not a second different symbol; and an image of a second view of the second container, the second view includes the second symbol and not the first symbol, wherein five or more sides of the second container are visible in the images and wherein in the images the first and second symbols of the image's second container are substantially the same as the first and second symbols of the images of the first.container, wherein in the images both the first and second containers are marked with identification of different consignee and the same consignor.

* * * * *